United States Patent

[11] 3,526,195

| [72] | Inventor | Michael C. Maryonovich |
| | | Detroit, Michigan |
| [21] | Appl. No. | 748,294 |
| [22] | Filed | July 29, 1968 |
| [45] | Patented | Sept. 1, 1970 |
| [73] | Assignee | Borg-Warner Corporation |
| | | Chicago, Illinois |
| | | a corporation of Delaware |

[54] PALLET
2 Claims, 4 Drawing Figs.

[52] U.S. Cl. ........................................... 108/53
[51] Int. Cl. ....................................... B65d 19/38
[50] Field of Search ............................ 108/51-58

[56] References Cited
UNITED STATES PATENTS

| 2,544,657 | 3/1951 | Cushman | 108/53 |
| 3,140,672 | 7/1964 | De Luca | 108/53 |
| 3,187,691 | 6/1965 | Leitzel | 108/58 |
| 3,228,358 | 1/1966 | Sepe et al. | 108/58 |
| 3,331,336 | 7/1967 | Scholde et al. | 108/57 |
| 3,359,929 | 12/1967 | Carlson | 108/58 |
| 3,424,110 | 1/1969 | Toot | 108/53 |
| 2,973,931 | 3/1961 | Brown | 108/53 |

Primary Examiner—James T. McCall
Assistant Examiner—Glenn O. Finch
Attorney—Donald W. Banner, Lyle S. Motley, C. G. Stallings and William S. McCurry ABSTRACT: A pallet suitable for use in supporting parts and/or material during processing, or for storing or shipping the same. In a preferred embodiment, the pallet is constructed from a single sheet of thermoplastic material and is capable of being nested or stacked, depending on the orientation of adjacent pallets. The pallet includes a generally planar deck having a plurality of tapered, hollow legs extending away from the plane of the deck to permit nesting of at least two pallets. The legs are arranged asymmetrically with respect to the center line of the pallet and adjacent each leg is a socket which generally conforms to the end surface of each leg to receive the same when they are stacked, thereby preventing lateral shifting of one pallet with respect to another.

Patented Sept. 1, 1970
3,526,195
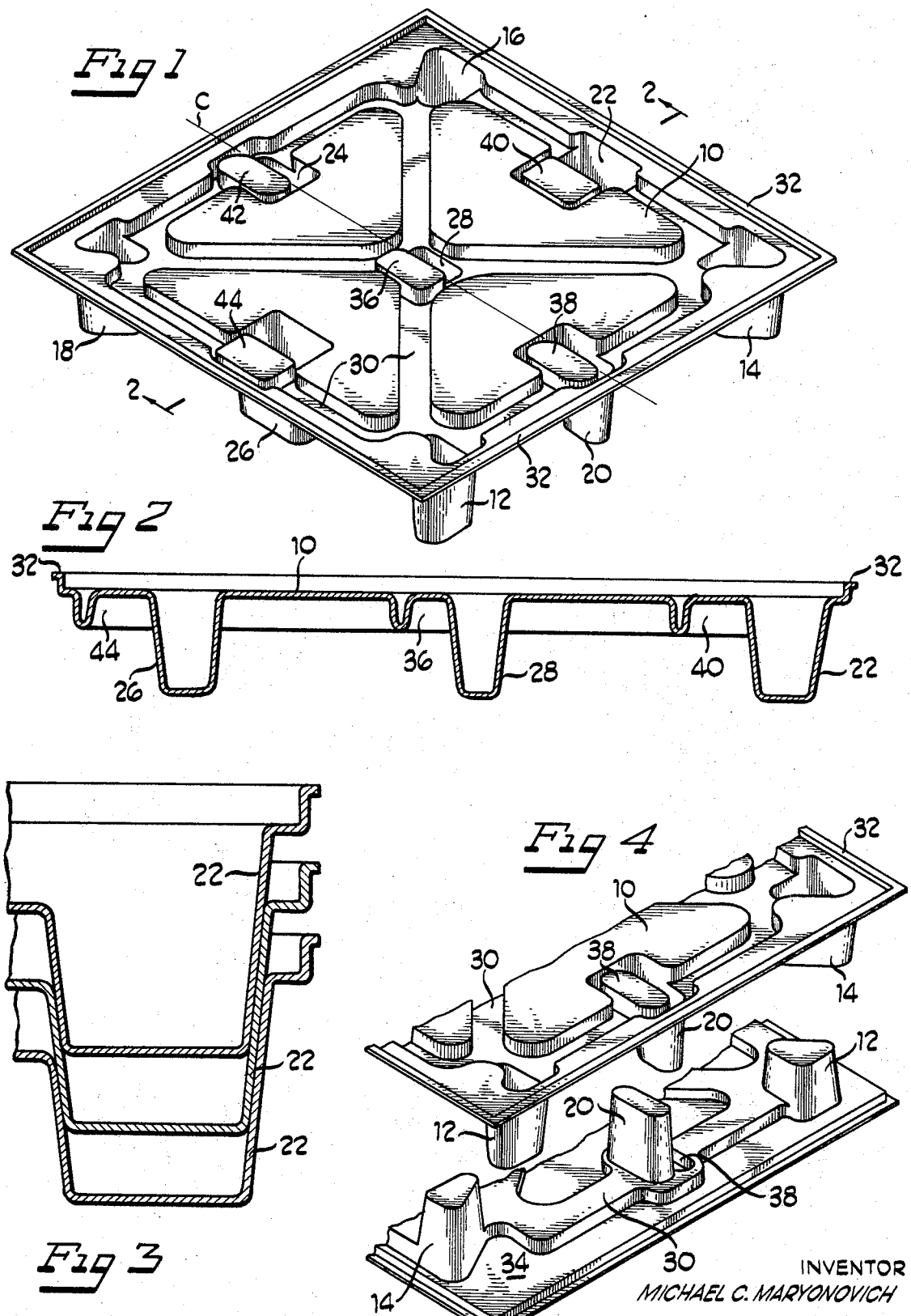
INVENTOR
MICHAEL C. MARYONOVICH
BY Thomas B. Hunter
ATTORNEY

PALLET

BACKGROUND AND SUMMARY OF THE INVENTION

Industrial pallets of the type suitable for use in the handling or storage of parts and material have generally been constructed from wood. Because of the rough handling to which such pallets are subjected in moving them from one location to another, the typical wooden pallet has a relatively short service life. While the cost of such wood pallets is relatively low, the short service life, coupled with the inconvenience of having to replace the wood pallets frequently, has led to the introduction of pallets which are formed of thermoplastic or thermosetting plastic materials. Such plastic pallets, while somewhat more expensive to manufacture, actually reduce overall costs because of their longer life, light-weight construction and durability.

One major disadvantage of most plastic pallets of the prior art is that they lack both nesting and stacking capability. As used in this specification, the term "nesting" refers to the ability of one pallet to be positioned on top of another such that the vertical components complement one another and thereby allow two or more pallets to be superimposed on each other such that the overall height is less than the sum of the height of the individual pallets. In referring to "stacking," the individual pallets rest on the adjacent lower pallet such that the height is equal to approximately the sum of the vertical dimensions of each individual pallet. In the stacked configuration, which is useful for temporary storage, the fork on the conventional fork lift truck can be inserted between adjacent stacked pallets. The nesting configuration is used primarily for the shipment of the pallets, or for longer than just temporary storage.

The pallet structure to which the present invention relates may be formed from a single sheet of thermoplastic material by conventional thermoforming processes, such as, for example, vacuum forming. In the typical vacuum forming process, a sheet of plastic material is heated to softening temperature and then drawn into a mold member by the application of vacuum between the sheet and the mold surface. Such processes are well-known; so it is not necessary to elaborate for the purposes of this disclosure.

The construction of this pallet described herein is such that the hollow legs which extend generally perpendicular to the main plane of the pallet are disposed in a non-symmetrical array. When oriented in one position the legs of one pallet will be received into the concave leg forms of a subjacent pallet; and in another orientation, the legs are received in a socket-like support located adjacent each leg.

It is therefore a principal object of the invention to provide an improved pallet structure which may be formed of a single sheet of thermoplastic material.

Another object of the invention is to provide a pallet which has both stacking and nesting capability.

Additional objects and advantages will be apparent from reading the following description taken in conjunction with the drawings.

THE DRAWINGS

FIG. 1 is an isometric view of a pallet constructed in accordance with the principles of the invention;

FIG. 2 is a cross-section view taken along the plane of line 2—2 of FIG. 1;

FIG. 3 is a fragmentary sectional view illustrating the nesting relationship of three adjacent pallets; and FIG. 4 is a partial isometric view illustrating two pallets to be positioned in the stacked mode.

Referring first to FIG. 1, the pallet illustrated has a generally rectangular configuration, it being understood that the principles described in this specification may be used in the design of pallets with varying shapes. The upper wall of the pallet is in the form of a planar deck 10 in which are formed a series of hollow legs 12, 14, 16 and 18, at each corner thereof, and a series of hollow legs 20, 22, 24, 26 and 28 formed in the interior area. All of the legs are spaced sufficiently far from each other and in parallel relation to permit the entrance of the forks of the lift truck to engage the underside of the pallet. Since the plastic material is inherently flexible, it is desirable to provide the deck with reinforcing means which may take the form of a plurality of reinforcing ribs 30. These ribs run along all four sides of the pallet and also in X configuration across the center of the pallet. Additional rigidity is imparted to the pallet by forming an upturned flange 32 on the periphery of the deck portion 10.

As best shown in FIG. 3, each of the legs is tapered so as to permit the reception of a leg on an adjacent pallet for nesting purposes.

As shown best in FIG. 4, the contour of the reinforcing rib 30 in the area adjacent to the corner legs is formed to accommodate a leg from another pallet in the stacked mode. The area defined by the rib, designated at 34 (FIG. 4), is generally congruent to the end surface of the leg to be fitted into position. It will be further noted that the corner legs are located so that they lie completely to one side of a diagonal bisecting said pallet to provide a surface in area 34 capable of supporting a complementary leg of another pallet.

Another important feature of the invention is the provision of socket-like depressions in the deck which seat the interior legs. These sockets, 36, 38, 40, 42 and 44, are located immediately adjacent the interior legs and arranged so that they will receive the legs of a superjacent pallet when oriented in the stacking position. This further prevents the shifting of the pallets with respect to each other and thus provides a safe, integrated stacking unit.

The location of the legs, it will be understood, is not especially critical so long as their position will permit stacking without interference between two legs when they are in the stacking position as shown in FIG. 4. One way of assuring that there will be no interference when the legs are positioned so that they are opposite one another, is to locate the various legs on an individual pallet such that they are positioned asymmetrically with respect to one of the principal center lines of the pallet. With reference to FIG. 1, the principal center line, designated at C, bisects the deck portion into two equal areas. All of the legs are thus asymmetrically disposed over the deck area with respect to such center line to insure that the legs are received within the adjacent socket portions provided.

While this invention has been described in connection with a certain specific embodiment thereof, it is to be understood that this is by way of illustration and not by way of limitation; and the scope of the appended claims should be construed as broadly as the prior art will permit.

I claim:

1. A pallet formed from a single sheet of material comprising a generally planar deck; a plurality of hollow legs extending away from the plane of said deck, and terminating end surfaces, said legs being tapered to permit nesting of at least two pallets, said legs being arranged so that they are positioned asymmetrically with respect to a center line of the pallet; and means defining a plurality of sockets adapted to receive the legs of a superjacent pallet to prevent lateral shifting of one pallet with respect to another when stacked with the legs in opposed relation, said means including a reinforcing rib in said deck generally conforming with the end surfaces of said legs.

2. A pallet as defined in claim 1, wherein at least some of said legs have a generally triangular cross-section and wherein they are located such that one side of the leg lies completely to one side of a diagonal bisecting said pallet to provide a surface capable of supporting a complementary leg of another pallet.